United States Patent Office 2,920,063
Patented Jan. 5, 1960

2,920,063

AROMATIC ACID AMIDES OF AMINOALKYL VINYL ETHERS AND THEIR POLYMERS

Sidney Melamed, Philadelphia, Pa., assignor to Rohm & Haas Company, Philadelphia, Pa., a corporation of Delaware No Drawing. Application December 8, 1954
Serial No. 474,004

16 Claims. (Cl. 260—85.5)

This invention relates to unsaturated organic compounds and polymers thereof. More particularly, the invention relates to new aromatic acid amides of aminoalkyl vinyl ethers and to their polymerization products.

The primary object of the present invention is to provide a new class of vinyl ethers which are stable under ordinary conditions but which can be converted to polymers and copolymers in the presence of suitable initiators or catalysts. Other objects of the invention will be apparent from the description thereof hereinafter.

The compounds of the invention have the structure of Formula I:

I    $CH_2=CHOANRCOR'$ where A is a straight-chain or branched-chain alkylene group having 2 to 18 carbon atoms of which at least two in a chain separate the adjoining nitrogen and ether oxygen atoms;

R is H, phenyl, tolyl, benzyl, cyclohexyl, or an alkyl group having 1 to 18 carbon atoms;

R' is phenyl, tolyl, xylyl or these groups in which the benzene ring is substituted with halogen (especially chlorine), nitro groups, or hydroxyl groups.

In general, the new compounds of the present invention may be prepared by reacting an amine of Formula II:

II    $CH_2=CHOANHR$ in which the symbols A and R have the same meaning as given above with an ester or chloride of such aromatic acids as: benzoic, p-bromobenzoic, o-chlorobenzoic, p-chlorobenzoic, 2,4-dichlorobenzoic, p-nitrobenzoic, o-nitrobenzoic, salicylic (o-hydroxybenzoic), m-hydroxybenzoic, p-hydroxybenzoic, protocatechuic (3,4-dihydroxybenzoic, pyrocatechuic (2,3-dihydroxybenzoic), vanillic (2-hydroxy-3-methoxy-benzoic), β-resorcylic (2,4-dihydroxybenzoic), α-resorcylic (3,5-dihydroxybenzoic), γ-resorcylic (2,6-dihydroxybenzoic), gallic (3,4,5-trihydroxybenzoic), m-toluic, o-toluic, p-toluic, 2,3-xylic, 3,4-xylic, 2,6-xylic, 2,4-xylic, and 2,5-xylic.

Representative amines of Formula II include the following:

$CH_2=CHOCH_2CH_2NH_2$
$CH_2=CHOCH_2CH_2NHCH_3$
$CH_2=CHOCH_2CH_2NH_2$
$CH_2=CHOCH_2CH(CH_3)NH_2$
$CH_2=CHOCH(CH_3)CH_2NH_2$
$CH_2=CHOCH_2C(CH_3)_2NH_2$
$CH_2=CHOC(CH_3)_2CH_2NH_2$
$CH_2=CHOCH_2CH_2CH_2CH_2NH_2$
$CH_2=CHOC(CH_3)_2CH_2CH(CH_3)NH_2$
$CH_2=CHOCH_2CH_2CH(CH_3)(CH_2)_3C(CH_3)_2NH_2$
$CH_2=CHOCH_2C(CH_3)_2CH_2NH_2$
$CH_2=CHOCH_2CH(CH_3)NHCH_3$
$CH_2=CHOCH(C_{16}H_{33})CH_2NH_2$

The vinyl aminoalkyl ether may have an N-substituent (R) other than hydrogen and the preferred methyl group, such as ethyl, butyl, phenyl, methylphenyl, benzyl, cyclohexyl, and so on, typical compounds then being $CH_2=CHOCH_2CH_2NHC_6H_5$ (distilling at 128°–130° C./9 mm.), $CH_2=CHOCH_2CH_2NHC_4H_9$ (distilling at 88°–99° C./120 mm.)

$CH_2=CHOCH(CH_3)CH_2NHC_2H_5$ (distilling at 72°–73° C./120 mm.)

$CH_2=CHOCH_2CH_2NHCH_2C_6H_5$ and $CH_2=CHOCH_2CH_2NHC_6H_{11}$, in which $C_6H_{11}$ is cyclohexyl.

When the production of the new monomeric amides is accomplished by reaction of an ester with a vinyl ether of Formula II, the reaction may be effected in the presence of an alkali metal alkoxide such as sodium methoxide in an amount of 1 to 10%, preferably about 5%, on the weight of the reactants. However, the presence of this alkoxide is not essential. The reaction may be effected in the presence of a solvent, preferably in an alcohol corresponding to the alkyl group of the ester that is reacted. Thus when a methyl ester is used, reaction in methanol is preferred. While the reaction may be effected at room temperature, shorter times are involved if higher temperatures are employed. For example, the reaction mixture may be refluxed at 60 to 80° C. or higher for 4 to 8 hours. The product may be obtained by stripping off solvent or by adding a nonsolvent to effect precipitation of the product. It may be purified by recrystallization from suitable solvents, if desired.

When the chloride of the aromatic acid is reacted with the vinyl ether of Formula II, the reaction may be carried out in the presence of excess amine, such as two or more moles of amine to one mole of the acid chloride, or in the presence of an inorganic alkaline material such as sodium or potassium hydroxide or carbonate as an acceptor for the hydrogen chloride liberated by the reaction. The reaction is preferably carried out in a solvent, such as benzene, ether, acetonitrile, chloroform or dioxane. When inorganic bases are employed as acid acceptors, mixtures, such as benzene or chloroform and water, may be preferably employed. The temperatures of reaction may vary widely but are preferably kept low, such as from —10° to 25° C., for a period of 1 to 4 hours. When the substituent R on the nitrogen atom is other than hydrogen, the use of the acid chloride as a reactant is preferred.

The monomeric compounds of the present invention, other than those derived from aromatic acids containing hydroxyl or nitro groups in the benzene nucleus, are readily polymerized and produce homopolymers as well as copolymers having a wide range of molecular weights including average molecular weights of 5000 to 50,000 or more. They may be polymerized in the presence of catalysts or initiators of the acyclic azo type. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis(α,γ-dimethylvaleronitrile), azobis(α-methylbutyronitrile), azobis(α-methylvaleronitrile), dimethyl azobismethylvalerate, and the like. In these catalysts one of the carbons bonded to the tertiary carbon atoms has its remaining valences satisfied by at least one element from the class consisting of oxygen and nitrogen. Polymerization may be effected in bulk, in solution, or in emulsion systems. To effect polymerization the amidoalkyl vinyl ether and the acyclic azo catalyst are mixed directly or in the presence of an inert solvent and the mixture is maintained between 60° and 100° C. until the desired extent of polymerization is attained. Solvents that may be used in polymerization include methanol, ethanol, isopropanol, butanol, dimethylformamide, dimethylacetamide, toluene, benzene, xylene, and so on. The amount of catalyst may be varied from about 0.1 to about 5% of the weight of the monomers. The polymerization is best carried out in an inert atmosphere, such as nitrogen gas.

For polymerization in solution, concentrations of monomer from about 50 to 90% are suitable. The course of polymerization may be readily followed from the increase in viscosity of the solution. The catalyst may be added in increments if desired with or without additional solvent.

For bulk polymerization, the preferred temperatures are from about 70 to 80° C. and the optimum proportion of catalyst is from 0.3% to 3% of the monomer weight.

The copolymerization may also be effected by an aqueous emulsion system using suitable emulsifying or dispersing agents, such as the higher alkylaryl polyethoxyethanols, such as the ethylene oxide modified alkyl phenols in which the alkyl group or groups has or have from 8 to 18 or more carbon atoms such as octyl, dodecyl, and octadecyl and which contain from 6 to 20 or more ethylene oxide units per molecule.

Examples of comonomers of monoethylenically unsaturated type which can thus be copolymerized with the monomers of the invention include vinylidene halides such as vinyl fluoride, vinyl chloride, vinyl bromide, vinyl iodide, 1,1-difluoroethylene, 1,1-dichloroethylene; vinylidene hydrocarbons such as isobutylene, 1,3-butadiene, styrene; halovinylidene hydrocarbons such as 2-fluoro-1,3-butadiene, 2-chloro-1,3-butadiene, 2,3-dichloro-1,3-butadiene; acrylic, haloacrylic and alkacrylic esters, nitriles and amides such as ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinyl-succinimide; unsaturated ether such as vinyl ethyl ether, vinyloxyethylurea, aminoethyl vinyl ether, formamidoethyl vinyl ether; other vinyl monomers such as vinylpyridine, N-vinyl caprolactam; and other polymerizable or copolymerizable unsaturates such as tetrafluoroethylene, diethyl fumarate, dimethyl maleate, N-vinyl-N,N′-ethyleneurea, and the like.

When the monomeric compounds of the present invention are derived from amines in which R is H and/or from aromatic acids containing hydroxyl groups, the monomers may be modified by reaction with numerous materials. One important class of such materials include the alkylene oxides such as ethylene oxide, propylene oxide, or trimethylene oxide. Anywhere from 1 mole to 100 moles of alkylene oxide may be reacted per hydroxyl group in the monomeric or polymeric compounds. Preferably one to 10 moles of ethylene oxide are employed. The reaction with the alkylene oxide may be carried out in an alkaline aqueous solution of 1% to 5% of sodium or potassium hydroxide or carbonate at a temperature of 50–100° C. for a period of 1 to 10 hours.

The monomeric compounds of the invention are generally of crystalline character having melting points which vary from just above room temperature up to well over 100° C. depending upon the various substituents in the amine as well as the molecular size of the amine and the acid whose derivative is reacted with the amine. Where A is short, as in the case of ethylene or propylene, and R is small, as in the case of hydrogen or methyl, and the acid from which the amide is obtained contains a plurality of hydroxyl groups, the monomeric amide of the present invention is essentially hydrophilic in character. Their water-solubility may be increased by reaction with an alkylene oxide, especially ethylene oxide, and this expedient may even be employed to impart water-solubility to the monomeric amides or polymeric amides of the present invention derived from amines in which A and R are somewhat larger than propylene or methyl respectively, and even from those monomers derived from aromatic acids which contain a single hydroxyl group in the aromatic nucleus. When the hydrophobic component or components of the monomeric compounds are large and adequate hydroxyl or hydroxyl-terminated-oxyethylene units are present to impart strong hydrophilic character to the acid residue in the compounds, the products have surface-activity and their polymers also possess this characteristic. Such compounds are useful as wetting agents, dispersing agents and emulsifying agents in the textile, leather, and paper industries. These hydrophilic compounds are also useful as humectants or softeners as in cosmetics, such as hand or facial lotions, and may be used for the softening of cellophane, rayon, wrapping papers, tobacco, and the like. For this purpose they may be combined with conventional softening agents such as glycerine, the lower glycols, such as ethylene glycol, diethylene glycol, and urea.

Those monomeric compounds which contain a large hydrophobic group and a relatively small or no hydroxyl content, insufficient to offset the hydrophobic character of the main part of the molecule, are valuable as wax substitutes and as components of compositions intended to coat or impregnate leather, paper, cellophane, or textiles with a water-repellent or water-proofing finish.

The monomeric amides of the present invention whose amido nitrogen carry a hydrogen atom and those which carry hydroxyl groups are capable of reacting with aldehydes, such as formaldehyde or acetaldehyde, or acids such as acetic, lauric, phthalic, and maleic acids. Hence they may be employed as modifying components in conjunction with other reactive resin-forming materials, such as the aminoplasts of which urea-formaldehyde, melamine-formaldehyde, and mixed melamine-urea-formaldehyde condensates are representative; in alkyd types of condensation products, such as glycerol-phthalates, and styrene-maleic anhydride copolymers.

Like the monomers, the polymers obtained have a wide range of properties and may range from water-soluble to water-insoluble and highly water-repellent compounds. In all of such polymers, however, the presence of hydroxyl groups and H atoms on the amido nitrogen provides reaction sites for the cross-linking of the polymers by condensation with difunctional reacting materials such as diacids, aldehydes, and so on. Like the monomers, the polymers and copolymers of the monomeric compounds of the present invention are useful as modifying components of reactive thermosetting types of resin-forming compositions including the aminoplasts mentioned above, the alkyds, epoxides, phenol-aldehyde resins, and so on. The water-soluble and water-sensitive polymers and copolymers may be used as dressing, finishing, conditioning and coating agents for paper, leather, and textiles of all sorts. They are especially valuable as warp sizes and as thickeners or protective colloids in conjunction with other dispersible materials, such as glue, gelatin, starch, dextrin, and the like. Certain of the polymers as well as copolymers which have proper balance between a highly hydrophobic portion in the molecule and a strongly hydrophilic portion are useful as wetting agents, dispersing agents and so on. Others of the polymers which have a highly hydrophobic character may be converted to suitable wetting agents by reaction with alkylene oxides and especially ethylene oxide to introduce sufficient thereof to impart a strongly hydrophilic portion to the polymer molecule.

The polymers which are of water-soluble character are useful in water-based emulsion paints, such as those based on emulsions of polyvinyl acetate or polyacrylates, when added in amounts of 1% to 3% of the weight of the main resin in the emulsion. Such additions improve the brushing characteristics of the paints and impart better "wet-edge" characteristics so that application of the paint to an adjoining area may be effected after substantial periods of time with less risk of lifting the previously applied coating or excessive thickness where the edges overlap.

The monomeric compounds of the present invention may be copolymerized in relatively small proportions ranging from 1 to 10 mole percent or more with 99–90 or less mole percent of other non-reactive monomers such as methyl methacrylate to impart to the copolymer obtained the capacity to react with other materials and thereby adapting the polymer of the other type of comonomer to be used as a modifier for aminoplasts, alkyd resins and epoxy resins. Such products are quite useful as pigment-binding compositions in the coating of papers or the pigment-dyeing of textiles. The copolymers may be used in a wide range of proportions from 15% to 25% by weight of the pigment in the case of coating of papers to 200% on the weight of the pigment in the case of pigment-dyeing of certain textiles. In these compositions, such pigments as clay, titanium dioxide, calcium carbonate, zinc oxide, lithopone and the like may be used.

The monomers themselves are useful as insecticides, bactericides and fungicides, those containing chlorine or nitro groups being especially effective as insecticides, and those containing hydroxyl groups being effective as bactericides. Both the monomers and polymers which contain chlorine substituents in the aryl nucleus and in which there is no free hydrogen attached to the amido nitrogen are valuable plasticizers for various resinous materials, especially polymers of vinyl chloride, vinylidene chloride, tetrafluoroethylene, chlorotrifluoroethylene, and copolymers containing a predominant proportion of one of the preceding materials with another of such materials or with vinyl acetate, acrylonitrile, or esters of acrylic acid or methacrylic acid, such as the methyl, ethyl, propyl, or butyl esters thereof. Those monomers and polymers of the present invention which contain a high proportion of chlorine relative to hydrocarbon content are useful for reducing flammability of formed masses, such as fibers, filaments, films, or sheets of ordinarily flammable materials, and they may be introduced into such former masses by the incorporation of 5–15% by weight of the chlorine-containing amides or polyamides of the present invention into the mass of film-forming material, such as a molten mass or solution thereof in an organic solvent, prior to the formation of the article from such molten mass or solution. Such chlorine-containing amides or polyamides of the present invention may also be applied as coatings to cellulosic articles, such as paper, felts or fabrics made of wood pulp, cotton or rayon fibers for the purpose of reducing the flammability thereof. The following examples are illustrative of the invention:

Example 1

(a) A 1-liter 4-necked flask equipped with stirrer, thermometer, condenser and dropping funnel is charged with 152 g. (1.1 mole) of potassium carbonate (anhydrous), 150 g. of water, 250 ml. of toluene and 174 g. (2.0 moles) of 2-aminoethyl vinyl ether. The mixture is cooled to 5° C. and stirred and 281 g. (2.0 moles) of benzoyl chloride is added dropwise with the temperature kept below 10° C. with an ice-acetone bath. The addition is completed in 4 hours; the mixture is stirred at 25° C. for 1 hour and filtered. The layers are separated and the toluene layer is dried with $MgSO_4$, filtered, and acetone is added to precipitate the product, 2-benzamidoethyl vinyl ether, which is recrystallized from anhydrous ether and is obtained in 64% yield. It has a M.P. of 55.5–56.5° C. Analysis shows a 7.3% nitrogen content as compared to 7.25% N theoretical.

(b) The procedure of part (a) hereof is repeated substituting two moles of o-toluic acid chloride for the benzoyl chloride of part (a). A colorless product, 2-(o-toluylamidoethyl) vinyl ether, is obtained.

(c) The procedure of part (a) hereof is repeated except that two moles of the chloride of 2,3-xylic acid is substituted for the benzoyl chloride. A crystalline white solid product is obtained.

(d) The procedure of part (a) hereof is repeated substituting two moles of 5-aminopentyl vinyl ether for the vinyl ether of part (a). The product is a white crystalline solid having a waxy feel.

(e) The procedure of part (a) hereof is repeated replacing the vinyl ether thereof with two moles of phenylaminoethyl vinyl ether.

(f) The procedure of part (a) hereof is repeated replacing the vinyl ether with two moles of benzylaminoethyl vinyl ether.

(g) The procedure of part (a) hereof is repeated substituting two moles of N-methyl-2-aminoethyl vinyl ether for the vinyl ether of part (a).

Example 2

(a) The procedure of Example 1(a) is carried out substituting two moles of 2-methylaminoethyl vinyl ether for the vinyl ether of Example 1(a) and substituting two moles of p-nitro benzoyl chloride for the benzoyl chloride of Example 1(a). A 71% yield is obtained of the N-methyl-N-vinyloxyethyl-p-nitro benzamide having a melting point of 51.1–52.5° C. and nitrogen content of 11.0% (as compared to a theoretical nitrogen content of 11.2%). The product is a useful insecticide particularly as a stomach poison for the control of armyworms.

(b) The procedure of part (a) hereof is repeated substituting two moles of 2-aminoethyl vinyl ether for the vinyl ether of part (a). An off-white crystalline product is obtained.

(c) The procedure of part (a) hereof is repeated substituting two moles of phenylaminoethyl ether for the vinyl ether of part (a) hereof.

(d) The procedure of part (a) hereof is repeated substituting two moles of cyclohexylaminoethyl vinyl ether for the vinyl ether of part (a) hereof. The white crystalline product obtained has a waxy feel.

Example 3

(a) The procedure of Example 1(a) is repeated substituting two moles of vinyloxyisobutylamine for the vinyl ether of Example 1(a) and substituting two moles of o-chlorobenzoyl chloride for the benzoyl chloride of Example 1(a). A 79% yield of the amide is obtained having a melting point of 60–61° C. and having a nitrogen content of 5.4% (theoretical 5.5% N). The polymer when used in 5% concentration in hydrocarbon solvent such as deodorized kerosene or Stoddard solvent is useful as a fly or moth spray.

(b) The procedure of part (a) hereof is repeated substituting two moles of 2-amino-1-hexadecylethyl vinyl ether for the vinyl ether of part (a) hereof. The product is a white crystalline material of waxy character. A solution of 10% of the waxy amide thus obtained in deodorized kerosene is applied by spraying to a glove leather. There is imparted a highly water-repellent finish on the leather.

Example 4

(a) The procedure of Example 1(a) is repeated substituting two moles of salicylic acid chloride for the benzoyl chloride. The solid amide thus obtained is dispersed in ethanol and 1% of sodium ethoxide is introduced. Then ethylene oxide is introduced. Then ethylene oxide (10 moles per mole of amide) is introduced into the dispersion within a closed pressure vessel at a temperature of 30° C. The oxyethylene modified amide thus obtained after 16 hours of reaction shows surface-active characteristics and is useful as a wetting agent, especially in mercerizing liquors and scouring baths.

(b) The procedure of part (a) is repeated substituting two moles of gallic acid chloride for the salicylic chloride.

(c) The procedure of part (a) hereof is repeated substituting two moles of α-resorcylic acid chloride for the salicylic acid chloride.

*Example 5*

Ten parts by weight of benzamidoethyl vinyl ether obtained by the procedure of Example 1(a) is heated to 75° C. and 0.2 part by weight of dimethylazoisobutyrate is introduced with agitation. The mixture is agitated and heated at 75° C. for 16 hours, after which the polymer is precipitated with acetone. A 55% yield of polymer is obtained.

*Example 6*

Ten parts by weight of 2-(o-chlorobenzamido)isobutyl vinyl ether obtained by the procedure of Example 3(a) is heated to 75° C. in 0.2 part of dimethylazoisobutyrate and is introduced as a catalyst. After agitating at 75° C. for 16 hours, the polymer is precipitated with acetone.

*Example 7*

(a) Five parts by weight of 2-benzamidoethyl vinyl ether and five parts by weight of methyl methacrylate are dissolved in ten parts by weight of dimethylformamide. Then 0.2 part by weight of dimethylazoisobutyrate is added as a catalyst and the mixture is agitated and heated at 75° C. for 18 hours. The copolymer obtained is precipitated by the addition of methanol. It is readily dyed by means of numerous dyes, including acid wool dyes.

(b) Ten parts by weight of N-methyl-2-benzamidoethyl vinyl ether and 90 parts by weight of acrylonitrile are dissolved in 120 parts by weight of dimethylformamide. Two parts by weight of dimethylazoisobutyrate is added as a catalyst, and the mixture is stirred at 70° C. for 20 hours. The resulting dimethylformamide solution of the copolymer is diluted with an additional 250 parts by weight of dimethylformamide and then spun through a spinnerette into a dilute aqueous solution of dimethylformamide containing about 5 to 10% of dimethyl formamide. The resulting fibers after drying and stretching show good tensile strengths and can be readily dyed with acid wool dyes.

(c) Three parts by weight of 2-(o-chlorobenzamido)-isobutyl vinyl ether, 15 parts by weight of vinyl chloride, 25 parts by weight of water, 0.3 part of dimethyl azoisobutyrate, and 2 parts of sodium lauryl sulfate are charged to an autoclave swept free of air and heated at 55° C. for 16 hours with agitation. The polymer isolated by coagulation is washed well with water, dried and dissolved in acetone. Fibers, films or filaments cast or formed from a 20% solution of the copolymer show low flammability and increased toughness and flexibility over unmodified polyvinyl chloride.

It is to be understood that changes and variations may be made without departing from the spirit and scope of the invention as defined in the appended claims.

I claim:

1. A compound having the formula

CH$_2$=CHOANRCOR′ where:

A is an alkylene group having 2 to 18 carbon atoms of which at least two in a chain separate the adjoining nitrogen and ether oxygen atoms, R is selected from the group consisting of hydrogen, phenyl, tolyl, benzyl, cyclohexyl, and alkyl groups having 1 to 18 carbon atoms, and R′ is selected from the group consisting of phenyl, tolyl, and xylyl groups and said groups substituted by a member selected from the group consisting of halogen, nitro, and hydroxyl groups.

2. A polymer of a compound defined in claim 1.
3. 2-benzamidoethyl vinyl ether.
4. N-methyl-2-benzamidoethyl vinyl ether.
5. N-methyl-2-(p-nitrobenzamido) ethyl vinyl ether.
6. 2,2-dimethyl-2-(o-chlorobenzamido) ethyl vinyl ether.
7. 2-(salicylamido)ethyl vinyl ether.
8. A polymer of 2-benzamidoethyl vinyl ether.
9. A polymer of N-methyl-2-benzamidoethyl vinyl ether.
10. A polymer of 2,2-dimethyl-2-(o-chlorobenzamido)-ethyl vinyl ether.
11. A copolymer of 1 to 10 mole percent of 2-benzamidoethyl vinyl ether with 99 to 90 mole percent of at least one other monoethylenically unsaturated copolymerizable compound.
12. A copolymer of 1 to 10 mole percent of N-methyl-2-benzamidoethyl vinyl ether with 99 to 90 mole percent of at least one other monoethylenically unsaturated copolymerizable compound.
13. A copolymer of 1 to 10 mole percent of 2,2-dimethyl-2-(o-chlorobenzamido)ethyl vinyl ether with 99 to 90 mole percent of at least one other monoethylenically unsaturated copolymerizable compound.
14. A copolymer of 2-benzamidoethyl vinyl ether with methyl methacrylate.
15. A copolymer of N-methyl-2-benzamidoethyl vinyl ether with acrylonitrile.
16. A copolymer of 2,2-dimethyl-2-(o-chlorobenzamido)ethyl vinyl ether with vinyl chloride.

References Cited in the file of this patent

UNITED STATES PATENTS

| | | |
|---|---|---|
| 2,449,192 | Behrens et al. | Sept. 14, 1948 |
| 2,571,325 | Zentner et al. | Oct. 16, 1951 |
| 2,572,560 | Ham | Oct. 23, 1951 |
| 2,601,251 | Bruson | June 24, 1952 |
| 2,686,173 | Sauer | Aug. 10, 1954 |